United States Patent
Lee et al.

(10) Patent No.: US 12,230,229 B2
(45) Date of Patent: Feb. 18, 2025

(54) AFTERIMAGE ANALYZER, DISPLAY DEVICE, AND METHOD OF COMPENSATING AFTERIMAGE OF DISPLAY DEVICE

(71) Applicant: Samsung Display Co., Ltd., Yongin-Si (KR)

(72) Inventors: Jungyu Lee, Seoul (KR); Hyeonmin Kim, Gwacheon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/865,575

(22) Filed: Jul. 15, 2022

(65) Prior Publication Data

US 2023/0084458 A1  Mar. 16, 2023

(30) Foreign Application Priority Data

Sep. 14, 2021 (KR) .......................... 10-2021-0122452

(51) Int. Cl.
*G09G 5/00* (2006.01)
*G06V 10/25* (2022.01)

(52) U.S. Cl.
CPC ............ *G09G 5/005* (2013.01); *G06V 10/25* (2022.01); *G09G 2300/0452* (2013.01); *G09G 2320/0257* (2013.01); *G09G 2340/0407* (2013.01)

(58) Field of Classification Search
None
See application file for complete search history.

(56) References Cited

U.S. PATENT DOCUMENTS

| | | | |
|---|---|---|---|
| 2011/0206126 A1* | 8/2011 | Kim ......................... | G09G 3/20 375/E7.125 |
| 2012/0182311 A1* | 7/2012 | Watanabe .............. | H04N 7/013 345/629 |
| 2013/0194295 A1* | 8/2013 | Chan ...................... | G09G 5/395 345/204 |
| 2020/0020303 A1* | 1/2020 | Kim ......................... | G09G 3/32 |
| 2020/0082796 A1* | 3/2020 | Chun ...................... | G09G 5/38 |
| 2020/0372860 A1* | 11/2020 | Kim ...................... | G09G 3/3233 |
| 2022/0188977 A1 | 6/2022 | Lee | |

OTHER PUBLICATIONS

J. Redmon and A.Farhadi; YOLOv3: An Incremental Improvement; Computer Vision and Pattern Recognition; Apr. 8, 22:27:57; pp. 1-6.

* cited by examiner

*Primary Examiner* — Andre L Matthews
(74) *Attorney, Agent, or Firm* — Innovation Counsel LLP

(57) ABSTRACT

An afterimage analyzer may include an accumulation determiner which determines an accumulation interval of images based on a first change amount of images in regions of interest of the images in which an afterimage object is disposed and a second change amount of images in entire regions, an image accumulator which accumulates the images during the accumulation interval to generate accumulated images, and an afterimage object detector which detects the afterimage object from the accumulated images.

16 Claims, 9 Drawing Sheets

AFTERIMAGE ANALYZER, DISPLAY DEVICE, AND METHOD OF COMPENSATING AFTERIMAGE OF DISPLAY DEVICE

CROSS-REFERENCE TO RELATED APPLICATION(S)

This application claims priority under 35 USC § 119 to Korean Patent Application No. 10-2021-0122452 filed on Sep. 14, 2021, in the Korean Intellectual Property Office (KIPO), the entire disclosure of which is incorporated by reference herein.

BACKGROUND

1. Field

Embodiments relate to a display device. More particularly, embodiments relate to a display device for compensating afterimage and a method of compensating afterimage of the display device.

2. Description of the Related Art

As information technologies develop, the demand for display devices for displaying an image is increasing. The display devices may include a display device including a light emitting diode such as an organic light emitting diode, an inorganic light emitting diode, etc., a liquid crystal display device, a plasma display device, or the like.

As the driving time of the display device elapses, pixels included in the display device may be degraded, and an afterimage may be generated in the display device. Since objects such as a logo, a subtitle, etc. displayed with high luminance are continuously displayed in a specific region of an image for a long time, degradation of specific pixels may be accelerated, and an afterimage may occur in the display device.

In order to compensate the afterimage, luminances of pixels corresponding to the region of the image in which the afterimage is displayed may decrease. Accurate detection of an object included in an image may be necessary in order to compensate the afterimage.

SUMMARY

Embodiments provide an afterimage analyzer that accurately detects an afterimage object at low cost and a display device including the afterimage analyzer.

Embodiments provide a method of compensating afterimage of the display device that accurately detects an afterimage object at low cost and compensates image data.

An afterimage analyzer according to an embodiment may include an accumulation determiner which determines an accumulation interval of images based on a first change amount of images in regions of interest in which an afterimage object is disposed and a second change amount of images in entire regions; an image accumulator which accumulates the images during the accumulation interval to generate accumulated images; and an afterimage object detector which detects the afterimage object from the accumulated images.

In an embodiment, the accumulation determiner may include: a region of interest calculator which calculates the first change amount by comparing images in the regions of interest, an entire region calculator which calculates the second change amount by comparing images in the entire regions, and an accumulation interval determiner which changes the accumulation interval based on the first change amount and the second change amount.

In an embodiment, the accumulation interval determiner may increase the accumulation interval when the first change amount is less than a first reference value.

In an embodiment, the accumulation interval determiner may decrease the accumulation interval when the second change amount is greater than a second reference value.

In an embodiment, the accumulation determiner may further include a channel change detector which detects whether a channel of the images is changed by comparing the images in the regions of interest. The accumulation interval determiner may minimize the accumulation interval when the channel of the images is changed.

In an embodiment, the accumulation determiner may further include an accumulation domain determiner which determines an accumulation domain based on colors of the regions of interest. The image accumulator may accumulate the images during the accumulation interval and based on the accumulation domain.

In an embodiment, the accumulation domain determiner may determine an RGB domain as the accumulation domain when the colors of the regions of interest are chromatic colors and determine an YCbCr domain as the accumulation domain when the colors of the regions of interest are achromatic colors.

In an embodiment, the region of interest calculator may extract a motion vector in the regions of interest by comparing the regions of interest of the images and calculate the first change amount based on the motion vector.

In an embodiment, the region of interest calculator may calculate the first change amount based on a ratio of changed pixels to the random pixels which are randomly selected from all pixels disposed in the regions of interest by comparing the images in the regions of interest.

In an embodiment, the afterimage analyzer may further include a down-scaler which downscales the images and provide the down-scaled images to the accumulation determiner.

In an embodiment, the image accumulator may accumulate the images after compressing data for the images with a bit truncation.

In an embodiment, the afterimage object detector may include an artificial intelligence program which performs a machine learning for detecting the afterimage object.

A method of compensating afterimage of a display device according to an embodiment may include determining an accumulation interval of images based on a first change amount of the images in regions of interest in which an afterimage object is disposed and a second change amount of images in entire regions, accumulating the images during the accumulation interval to generate accumulated images; detecting the afterimage object from the accumulated images; and compensating image data based on the afterimage object.

In an embodiment, the determining the accumulation interval may include: calculating the first change amount by comparing images in the regions of interest; calculating the second change amount by comparing images in the entire regions; and changing the accumulation interval based on the first change amount and the second change amount.

In an embodiment, the changing the accumulation interval may include increasing the accumulation interval when the first change amount is less than a first reference value and decreasing the accumulation interval when the second change amount is greater than a second reference value.

In an embodiment, the determining the accumulation interval may further include detecting whether a channel of the images is changed by comparing the images in the regions of interest and minimizing the accumulation interval when the channel of the images is changed.

In an embodiment, the method may further include determining an accumulation domain based on colors of the regions of interest. Accumulating the images may include accumulating the images during the accumulation interval and based on the accumulation domain.

In an embodiment, the determining the accumulation domain may include determining an RGB domain as the accumulation domain when the colors of the regions of interest are chromatic colors and determining an YCbCr domain as the accumulation domain when the colors of the regions of interest are achromatic colors.

In an embodiment, the method may further include downscaling the images before the determining the accumulation interval.

A display device according to an embodiment may include a display panel including a plurality of pixels; an afterimage analyzer which detects information of an afterimage object from images; an afterimage compensator which compensates image data based on the information of the afterimage object, and a data driver which provides data signals corresponding to accumulated images to the display panel. The afterimage analyzer may include: an accumulation determiner which determines an accumulation interval of the images based on a first change amount of the images in regions of interest in which the afterimage object is disposed and a second change amount of images in entire regions, an image accumulator which accumulates the images during the accumulation interval and generate the accumulated images; and an afterimage object detector which detects the afterimage object from the accumulated images.

In the afterimage analyzer and the display device according to the embodiments, the accumulation interval of the images may be determined by calculating the change amount of the images in the regions of interest and the change amount of the images in the entire regions, so that the afterimage object may be accurately detected even with a low-capacity memory.

In the method of compensating afterimage of the display device according to the embodiments, the accumulation interval of the images may be determined by calculating the change amount of the regions of interest of the images and the change amount of the entire regions of the images, so that the afterimage object may be accurately detected even with a low-capacity memory, and the image data may be compensated thereby preventing the degradation of the pixels.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Hereinafter, display devices, afterimage analyzers, and methods of compensating afterimage of display devices in accordance with embodiments will be explained in detail with reference to the accompanying drawings.

Figure 1:
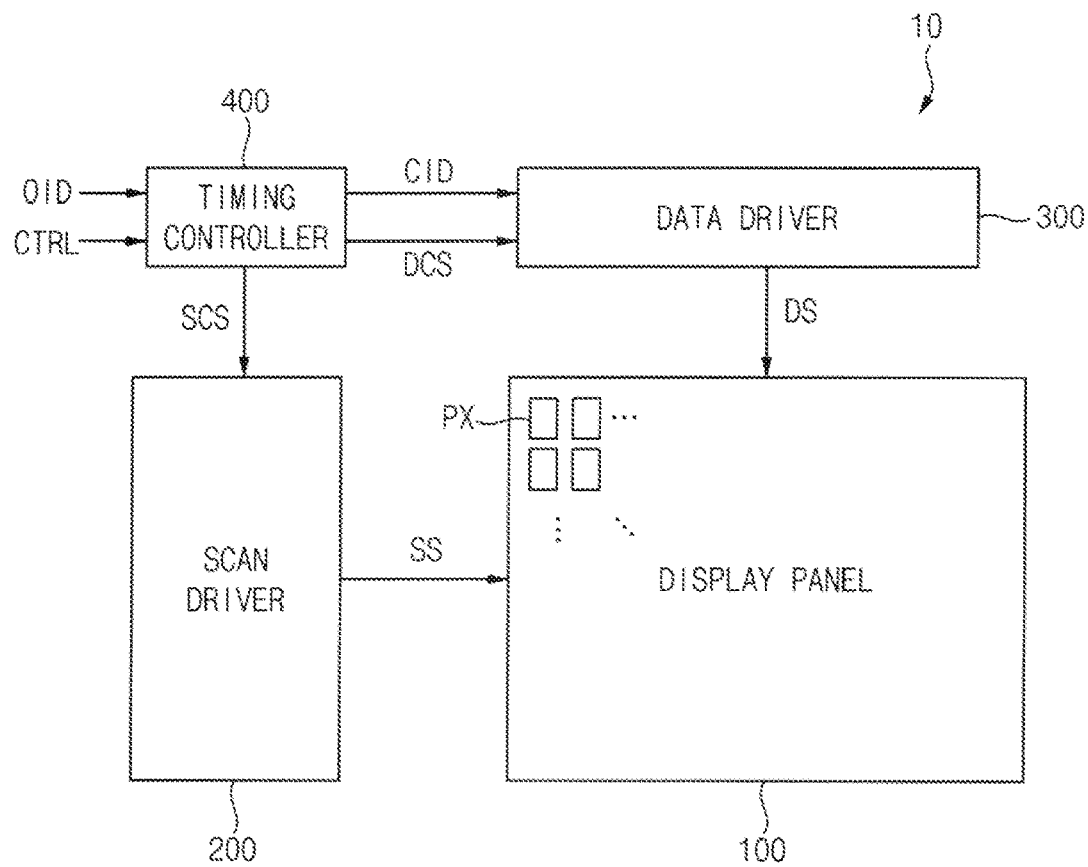
FIG. 1 is a block diagram illustrating a display device according to an embodiment.

FIG. 1 is a block diagram illustrating a display device 10 according to an embodiment.

Referring to FIG. 1, the display device 10 may include a display panel 100, a scan driver 200, a data driver 300, and a timing controller 400.

The display panel 100 may include a plurality of pixels PX. Each of the pixels PX may emit light in response to a scan signal SS provided from the scan driver 200 and a data signal DS provided from the data driver 300. The display panel 100 may display an image based on light emitted from the pixels PX.

The scan driver 200 may generate scan signals SS in response to a scan control signal SCS provided from the timing controller 400. The scan driver 200 may provide the scan signals SS to the display panel 100. The scan driver 200 may sequentially provide the scan signals SS to the pixels PX one row at a time.

The data driver 300 may generate data signals DS based on compensated image data CID and in response to a data control signal DCS provided from the timing controller 400. The data driver 300 may provide the data signals DS to the display panel 100. The data driver 300 may provide the data signals DS to pixels PX in a pixel mw to which the scan signal SS is provided.

The timing controller 400 may generate the compensated image data CID, the scan control signal SCS, and the data control signal DCS based on original image data OID and in response to a control signal CTRL provided from an external device. The timing controller 400 may provide the scan control signal SCS to the scan driver 200, and may provide the compensated image data CID and the data control signal DCS to the data driver 300. Accordingly, the timing controller 400 may control driving of the scan driver 200 and driving of the data driver 300.

Figure 2:
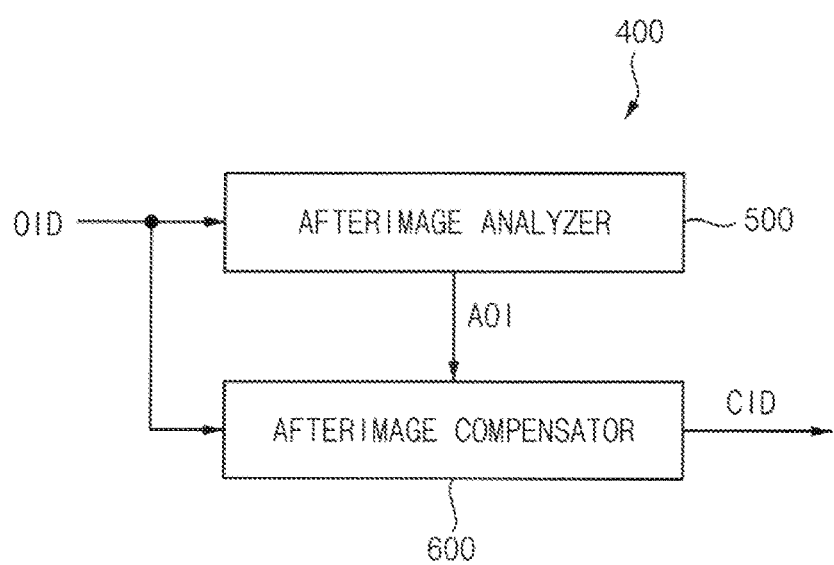
FIG. 2 is a block diagram illustrating a timing controller according to an embodiment.

FIG. 2 is a block diagram illustrating the timing controller 400 according to an embodiment.

Referring to FIG. 2, the timing controller 400 may include an afterimage analyzer 500 and an afterimage compensator 600.

The afterimage analyzer 500 may detect an object that may cause an afterimage from images. When a high-luminance afterimage object AO such as a logo, a subtitle, etc. continuously appears in an image displayed on the display panel 100, pixels PX displaying the afterimage object AO may be degraded. When the pixels PX are degraded, a difference in brightness and/or color of an image may occur, and accordingly, an afterimage may occur in the image.

The afterimage analyzer 500 may detect the afterimage object AO based on the original image data OID provided from the external device. The afterimage analyzer 500 may provide information of the afterimage object AOI to the afterimage compensator 600.

The afterimage compensator 600 may compensate the afterimage in the images. The afterimage compensator 600 may decrease luminances of the pixels PX corresponding to a region of the afterimage object AO to prevent the afterimage from being generated in the images by the afterimage object AO.

The afterimage compensator 600 may generate the compensated image data CID based on the original image data OID and the information of the afterimage object AO. The afterimage compensator 600 may provide the compensated image data CID to the data driver 300.

FIG. 2 illustrates that the afterimage analyzer 500 and the afterimage compensator 600 are included in the timing controller 400. However, the present disclosure is not limited thereto, and the afterimage analyzer 500 and/or the afterimage compensator 600 may not be included in the timing controller 400 but may be included in the data driver 300 or may be included in a separate device other than the timing controller 400 and the data driver 300.

Figure 3:
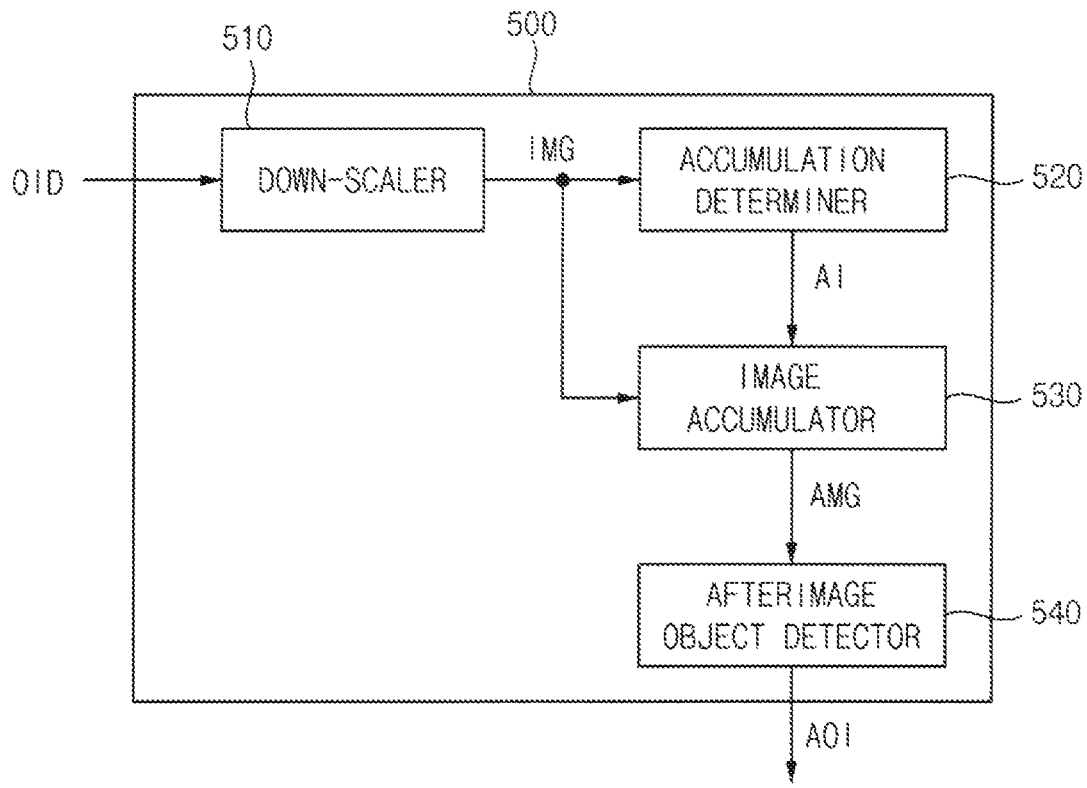
FIG. 3 is a block diagram illustrating an afterimage analyzer according to an embodiment.
Figure 4:
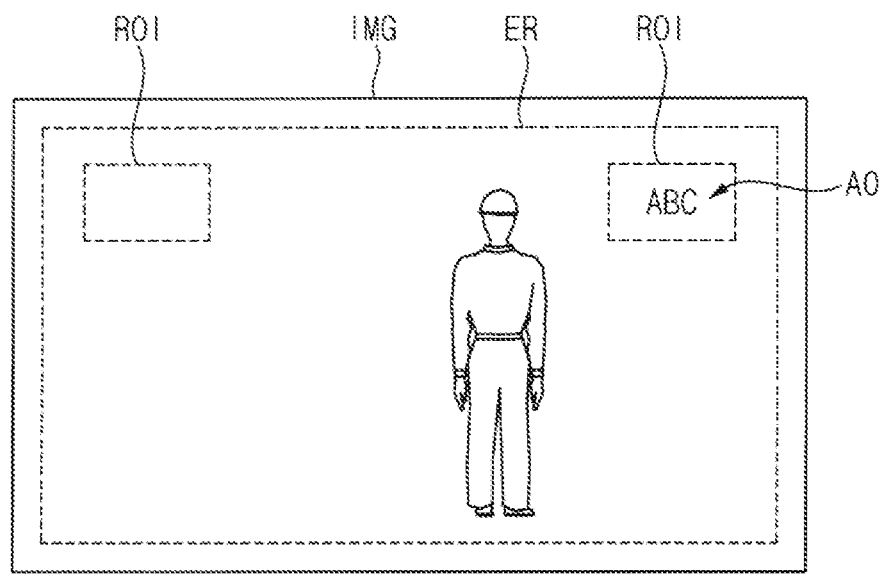
FIG. 4 is a diagram illustrating an image displayed on a display device.
Figure 5:
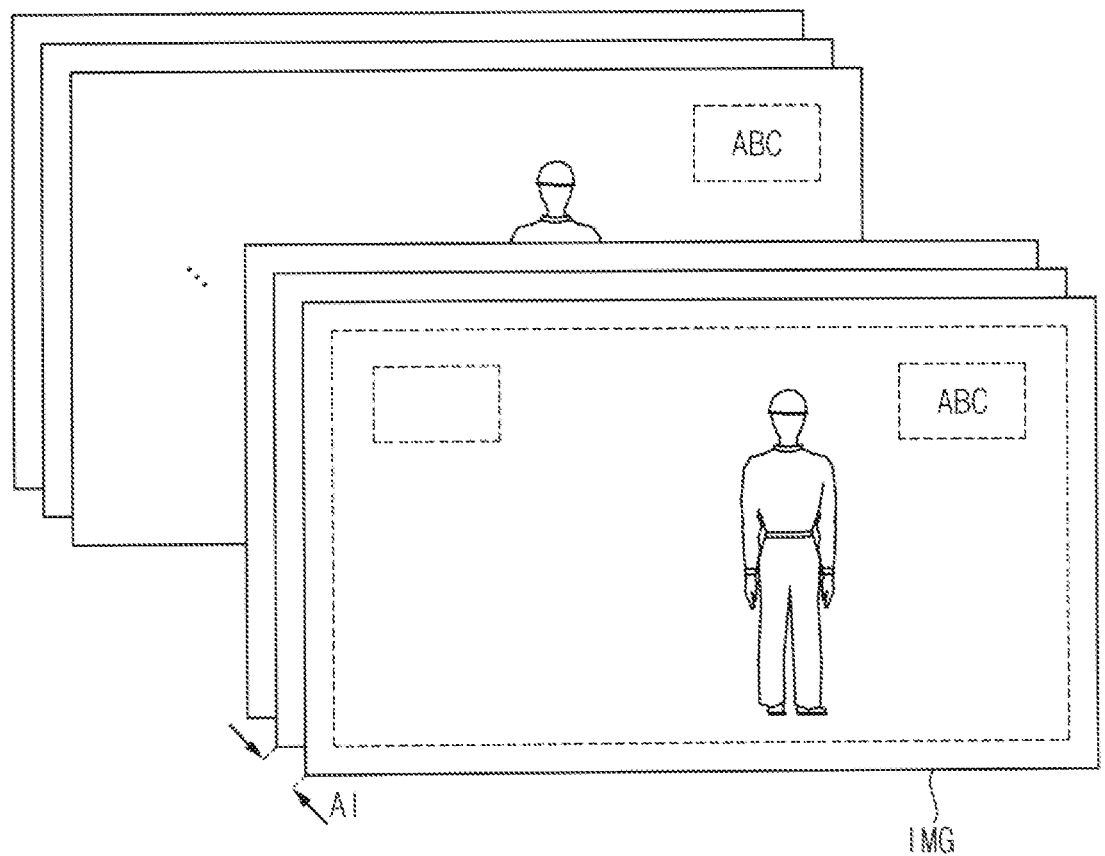
FIG. 5 is a diagram for describing accumulated images.

FIG. 3 is a block diagram illustrating the afterimage analyzer 500 according to an embodiment. FIG. 4 is a diagram illustrating an image IMG displayed on the display device 10. FIG. 5 is a diagram for describing accumulated images IMG.

Referring to FIG. 3, the afterimage analyzer 500 may include a down-scaler 510, an accumulation determiner 520, an image accumulator 530, and an afterimage object detector 540.

The down-scaler 510 may be connected to the external device and receive the original image data OID from the external device. The down-scaler 510 may down-scale the original image data OID and may provide the down-scaled images IMG to the accumulation determiner 520. The down-scaler 510 may convert original images included in the original image data OID into the down-scaled images IMG.

In the case of accumulating the original images to detect the afterimage object AO, since the size of the original image is large, a large amount of memory may be required to accumulate the original images, and the number of images that can be accumulated may be limited. Accordingly, the down-scaled image IMG may be generated by down-scaling the original image data OID to an extent not to affect the detection of the afterimage object AO. In an embodiment, the down-scaled image IMG having a size of 277×277 may be generated by down-scaling an original image having a size of 3840×2160.

Referring to FIG. 4, the accumulation determiner 520 may determine an accumulation interval AI of the down-scaled images IMG based on a first change amount of regions of interest ROI of the down-scaled images IMG in which afterimage object AO is displayed and a second change amount of entire regions ER of the down-scaled images IMG. The accumulation determiner 520 may generate the accumulation interval AI based on the down-scaled images IMG.

In an embodiment, the region of interest ROI may be determined based on a position of the afterimage object AO of previous images. In another embodiment, the region of interest ROI may be a predetermined region of the down-scaled image IMG. For example, the region of interest ROI may be predefined as an upper left and/or an upper right of the down-scaled image IMG.

Referring to FIG. 5, the image accumulator 530 may accumulate the images IMG during the accumulation interval AI. The down-scaled images IMG may be accumulated at regular frame intervals during the accumulation interval AI determined by the accumulation determiner 520. The frame interval between the accumulated down-scaled images IMG may increase as the accumulation interval AI increases and the frame interval between the accumulated down-scaled images IMG may decrease as the accumulation interval AI decreases. The image accumulator 530 may generate the accumulated images AMG of the down-scaled images IMG during the accumulation interval AI.

In an embodiment, the image accumulator 530 may accumulate the down-scaled images IMG after compressing data for the down-scaled images IMG by bit truncation. For example, when the size of the data for the down-scaled image IMG corresponding to one pixel PX is 8 bits and only 6 bits which are the date truncated by 2-bit are stored, the detection rate of the afterimage object AO is not significantly affected. When the down-scaled images IMG are accumulated after the data are compressed by the bit truncation, since the size of the accumulated data decreases, the number of down-scaled images IMG that can be accumulated in the memory having limited size may increase, and accordingly, the detection rate of the afterimage object AO may be improved.

The afterimage object detector 540 may detect the afterimage object AO from the accumulated images AMG. In an embodiment, the afterimage object detector 540 may include an artificial intelligence program that performs machine learning for detecting the afterimage object AO. For example, the afterimage object AO may be detected from the accumulated images AMG using machine learning based on a convolutional neural network model or the like.

Figure 6:
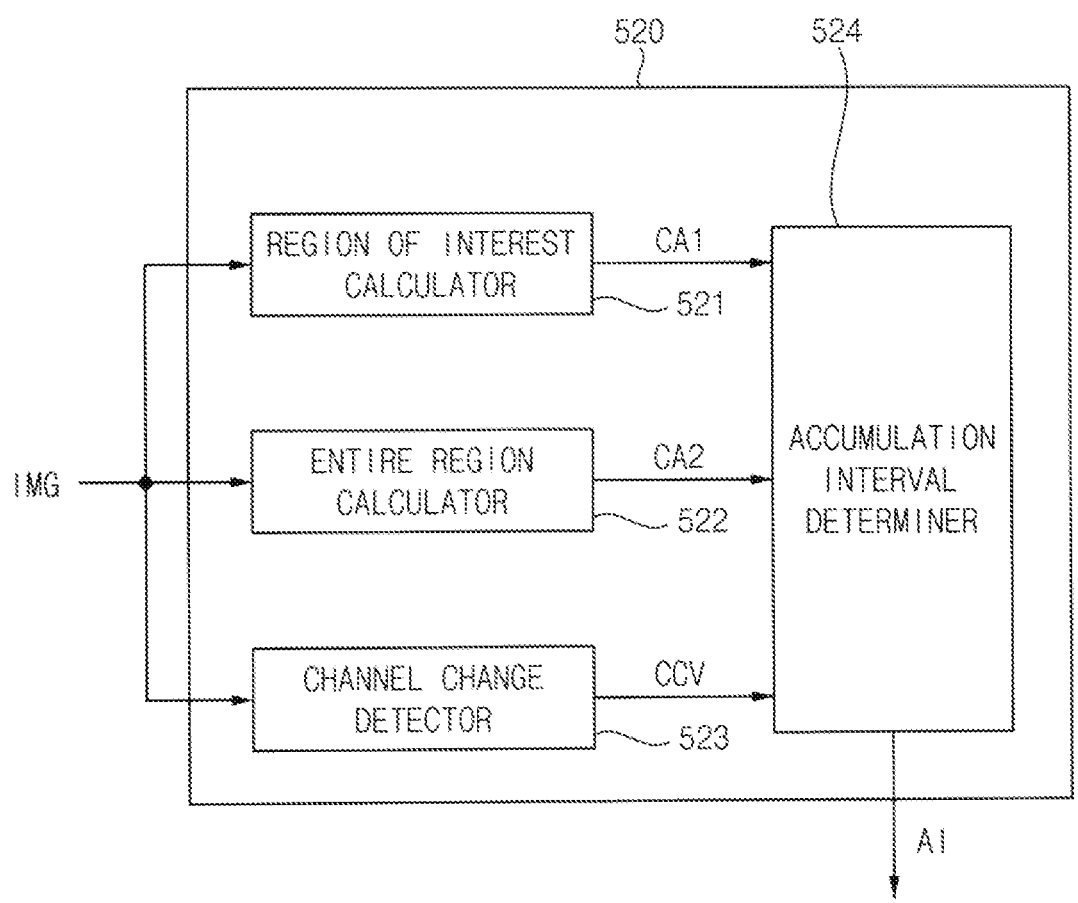
FIG. 6 is a block diagram illustrating an accumulation determiner according to an embodiment.

FIG. 6 is a block diagram illustrating the accumulation determiner 520 according to an embodiment.

Referring to FIG. 6, the accumulation determiner 520 may include a region of interest calculator 521, an entire region calculator 522, a channel change detector 523, and an accumulation interval determiner 524.

The region of interest calculator 521 may calculate the first change amount CA1 by comparing the down-scaled images IMG of different frames. The region of interest calculator 521 may calculate the first change amount CA1 by comparing the regions of interest of the down-scaled images IMG, and may provide the first change amount CA1 to the accumulation interval determiner 524.

In an embodiment, the region of interest calculator 521 may extract a motion vector within the region of interest ROI by comparing the down-scaled images IMG, and may calculate the first change amount CA1 based on the motion vector.

In another embodiment, the region of interest calculator 521 may calculate the first change amount CA1 based on a ratio of changed pixels PX to random pixels PX which are randomly selected from all the pixels disposed in the region of interest ROI by comparing the images IMG.

The entire region calculator 522 may calculate the second change amount CA2 by comparing the down-scaled images IMG of different frames. The entire region calculator 522 may calculate the second change amount CA2 by comparing entire regions ER of the images IMG and may provide the second change amount CA2 to the accumulation interval determiner 524.

In an embodiment, the entire region calculator 522 may extract a motion vector within the entire region ER by comparing the down-scaled images IMG and may calculate the second change amount CA2 based on the motion vector.

In another embodiment, the entire region calculator 522 may calculate the second change amount CA2 based on a ratio of changed pixels PX to random pixels PX which are randomly selected from all the pixels disposed in the entire region ER by comparing the down-scaled images IMG.

The channel change detector 523 may detect whether a channel is changed by comparing the down-scaled images IMG of different frames. The channel change detector 523 may detect whether the channel is changed by comparing the regions of interest ROI of the down-scaled images IMG and may provide a channel change value CCV which includes information about whether or not the channel is changed to the accumulation interval determiner 524. In an embodiment, when a change in the regions of interest ROI of the down-scaled images IMG is greater than or equal to a reference value and the change in the regions of interest ROI maintains to be greater than or equal to a reference value, the channel change detector 523 may determine that the channel is changed.

The accumulation interval determiner 524 may determine an accumulation interval AI based on the first change amount CA1, the second change amount CA2, and the channel change value CCV. The accumulation interval determiner 524 may provide the accumulation interval AI to the image accumulator 530.

The accumulation interval determiner 524 may increase or decrease the accumulation interval AI based on the first change amount CA1 and the second change amount CA2. The accumulation interval determiner 524 may increase the accumulation interval AI when the first change amount CA1 is less than a first reference value. When the amount of change in the regions of interest ROI of the down-scaled images IMG is relatively small (e.g., when the first change amount CA1 is less than the first reference value), the accumulation interval AI of the down-scaled images IMG may increase, so that the detection rate of the afterimage object AO may increase in the memory of the limited size.

The accumulation interval determiner 524 may decrease the accumulation interval AI when the second change amount CA2 is greater than a second reference value. When the amount of change in the entire regions ER of the down-scaled images IMG is relatively large (e.g., when the second change amount CA2 is greater than the second reference value), the afterimage object AO within the region of interest ROI is highly likely to be changed, so that a relatively large number of down-scaled images IMG may be accumulated in a predetermined frames by decreasing the accumulation interval AI of the down-scaled images IMG.

When the channel of the down-scaled images IMG is changed, the accumulation interval determiner 524 may minimize the accumulation interval AI based on the channel change value CCV. When the channel of the down-scaled images IMG is changed, the accumulation interval determiner 524 may minimize the accumulation interval AI to one frame. When the memory is completely filled with data for the accumulated down-scaled images IMG, the accumulation determiner 520 may adjust the accumulation interval AI by calculating the first change amount CA1 and the second change amount CA2.

Figure 7:
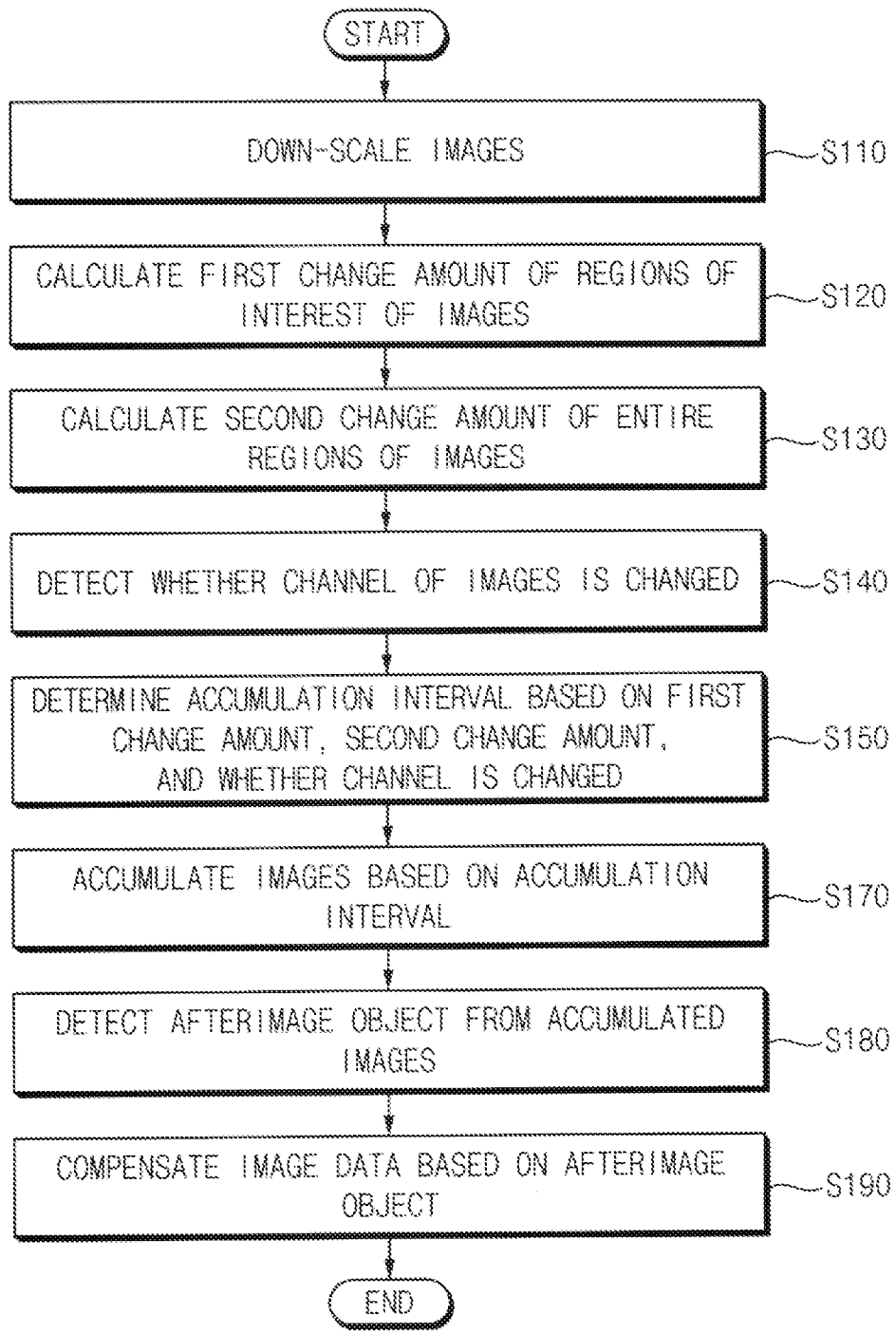
FIG. 7 is a flowchart illustrating a method of compensating afterimage of a display device according to an embodiment.

FIG. 7 is a flowchart illustrating a method of compensating afterimage of the display device 10 according to an embodiment.

Referring to FIG. 7, the down-scaler 510 may down-scale the original image data OID into the down-scaled images IMG (S110). The down-scaler 510 may convert the original images included in the original image data OID into the down-scaled images IMG by down-scale the original images.

The region of interest calculator 521 may calculate the first change amount CA1 of the regions of interest ROI of the down-scaled images IMG by comparing the images IMG of different frames (S120). In an embodiment, the region of interest calculator 521 may extract a motion vector within the region of interest ROI by comparing the down-scaled images IMG and may calculate the first change amount CA1 based on the motion vector. In another embodiment, the region of interest calculator 521 may calculate the first change amount CA1 based on a ratio of changed pixels PX to the random pixels PX in the region of interest ROI by comparing the down-scaled images IMG.

The entire region calculator 522 may calculate the second change amount CA2 of the entire regions ER of the down-scaled images IMG by comparing the down-scaled images IMG of different frames (S130). In an embodiment, the entire region calculator 522 may extract a motion vector within the entire region ER by comparing the down-scaled images IMG and may calculate the second change amount CA2 based on the motion vector. In another embodiment, the entire region calculator 522 may calculate the second change amount CA2 based on a ratio of changed pixels PX to the random pixels PX in the entire region ER by comparing the down-scaled images IMG.

The channel change detector 523 may detect whether a channel of the images IMG is changed by comparing the down-scaled images IMG of different frames (S140). In an embodiment, when a change in the regions of interest ROI of the down-scaled images IMG is greater than or equal to a reference value and the change in the regions of interest ROI maintains to be greater than or equal to the reference value, the channel change detector 523 may determine that the channel is changed.

The accumulation interval determiner 524 may determine the accumulation interval AI based on the first change amount CA1, the second change amount CA2, and the channel change value CCV (S150).

The accumulation interval determiner 524 may increase or decrease the accumulation interval AI based on the first change amount CA1 and the second change amount CA2. The accumulation interval determiner 524 may increase the accumulation interval AI when the first change amount CA1 is less than a first reference value. The accumulation interval determiner 524 may decrease the accumulation interval AI when the second change amount CA2 is greater than a second reference value.

The accumulation interval determiner 524 may minimize the accumulation interval AI when the channel of the down-scaled images IMG is changed. When the channel of the down-scaled images IMG is changed, the accumulation interval determiner 524 may minimize the accumulation interval AI to one frame. When the memory is completely filled with data for the accumulated down-scaled images IMG, the accumulation determiner 520 may adjust the accumulation interval AI by calculating the first change amount CA1 and the second change amount CA2.

The image accumulator 530 may accumulate the down-scaled images IMG based on the accumulation interval AI (S170). The down-scaled images IMG may be accumulated at regular frame intervals based on the accumulation interval AI determined by the accumulation determiner 520. The image accumulator 530 may generate the accumulated images AMG based on the down-scaled images IMG and the accumulation interval AI.

In an embodiment, the image accumulator 530 may accumulate the down-scaled images IMG after compressing data for the down-scaled images IMG by bit truncation.

The afterimage object detector 540 may detect the afterimage object AO from the accumulated images AMG (S180). In an embodiment, the afterimage object detector 540 may include an artificial intelligence program that performs machine learning for detecting the afterimage object AO.

The afterimage compensator 600 may compensate image data based on the afterimage object AO (S90). The afterimage compensator 600 may generate the compensated image data CID based on the original image data OID and the information of the afterimage object AO.

The data driver 30) may generate the data signal DS based on the compensated image data CID. The pixels PX of the display panel 100 may emit light based on the data signal DS. As the display panel 100 displays an image based on the data signal DS corresponding to the compensated image data CID for compensating the afterimage, the degradation of the pixels PX due to the afterimage object AO that may cause the afterimage may be prevented.

Figure 8:
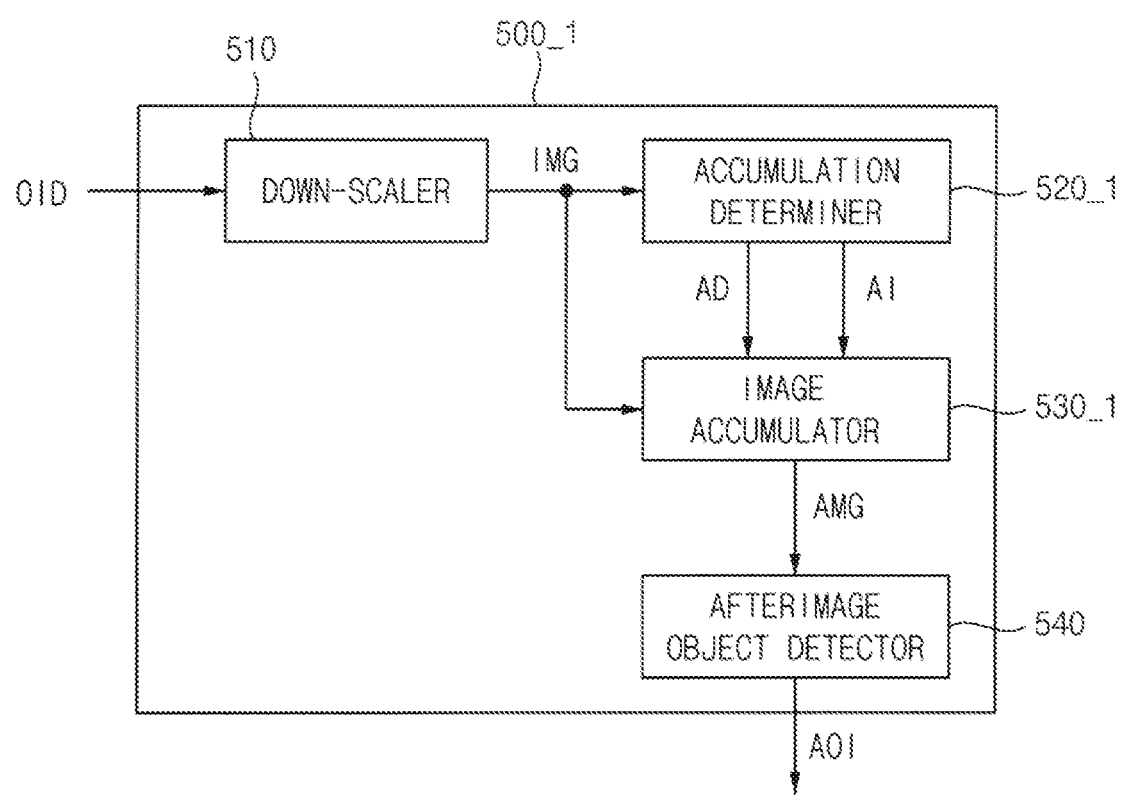
FIG. 8 is a block diagram illustrating an afterimage analyzer according to an embodiment.
Figure 9:
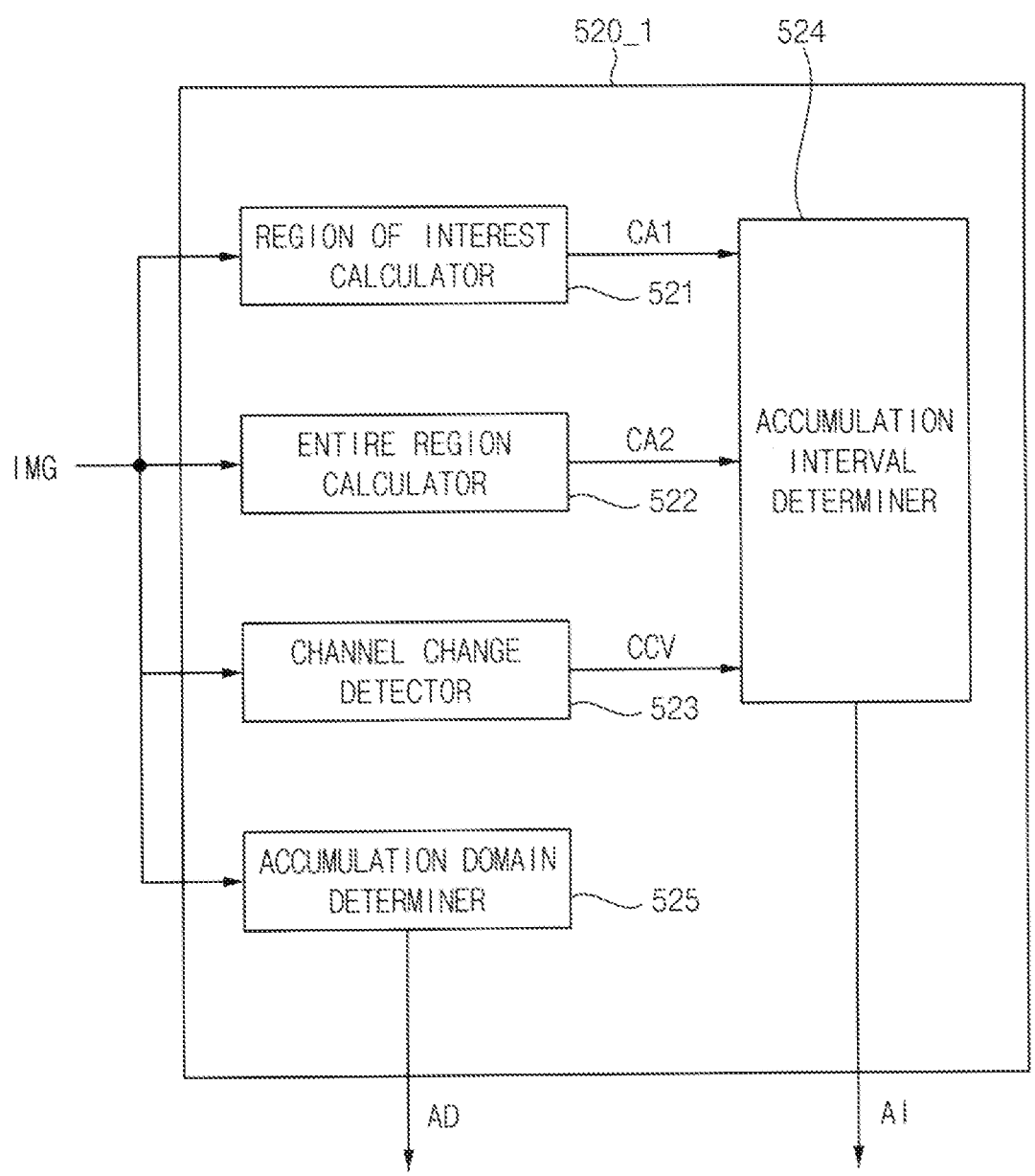
FIG. 9 is a block diagram illustrating an accumulation determiner according to an embodiment.

FIG. 8 is a block diagram illustrating an afterimage analyzer 500_1 according to an embodiment. FIG. 9 is a block diagram illustrating an accumulation determiner 520_1 according to an embodiment.

Referring to FIGS. 8 and 9, the afterimage analyzer 500_1 may include a down-scaler 510, an accumulation determiner 520_1, an image accumulator 530_1, and an afterimage object detector 540. The accumulation determiner 520_1 may include a region of interest calculator 521, an entire region calculator 522, a channel change detector 523, an accumulation interval determiner 524, and an accumulation domain determiner 525. The afterimage analyzer 500_1 described with reference to FIGS. 8 and 9 may be substantially the same as or similar to the afterimage analyzer 500 described with reference to FIGS. 3 and 6 except for the accumulation determiner 520_1 and the image accumulator 530_1, so that descriptions of overlapping components will be omitted.

The accumulation determiner 520_1 may determine the accumulation interval AI of the down-scaled images IMG based on a first change amount of the regions of interest ROI of the down-scaled images IMG in which the afterimage object AO is positioned and a second change amount of the entire regions ER of the images IMG, and may determine an accumulation domain AD based on colors of the regions of interest ROI of the down-scaled images IMG. The accumulation determiner 520_1 may generate the accumulation interval AI and the accumulation domain AD based on the down-scaled images IMG.

The accumulation domain determiner 525 may determine the accumulation domain AD based on the colors of the region of interest ROI of the down-scaled image IMG. The accumulation domain determiner 525 may determine an RGB domain as the accumulation domain AD when the colors of the regions of interest ROI are chromatic colors, and may determine a YCbCr domain as the accumulation domain AD when the colors of the regions of interest ROI are achromatic colors. If the RGB domain is stored when the colors of the regions of interest ROI are achromatic colors, the detection rate of the afterimage object AO may decrease due to noise or the like. Accordingly, as the YCbCr domain is determined as the accumulation domain AD when the colors of the regions of interest ROI are achromatic colors, a performance of detecting the afterimage object AO of the afterimage object detector 540 may improve.

The image accumulator 530_1 may accumulate the down-scaled images IMG based on the accumulation interval AI and the accumulation domain AD. The down-scaled images IMG may be accumulated at regular frame intervals based on the accumulation interval AI determined by the accumulation determiner 520_1, and the format of data stored in the memory may be determined based on the accumulation domain AD determined by the accumulation determiner 520_1. When the accumulation domain A) is the YCbCr domain, the down-scaled images IMG may be accumulated by storing a Y component (brightness) of the down-scaled image IMG in the memory. The image accumulator 530_1 may generate the accumulated images AMG based on the down-scaled images IMG, the accumulation interval AI, and the accumulation domain AD.

Figure 10:
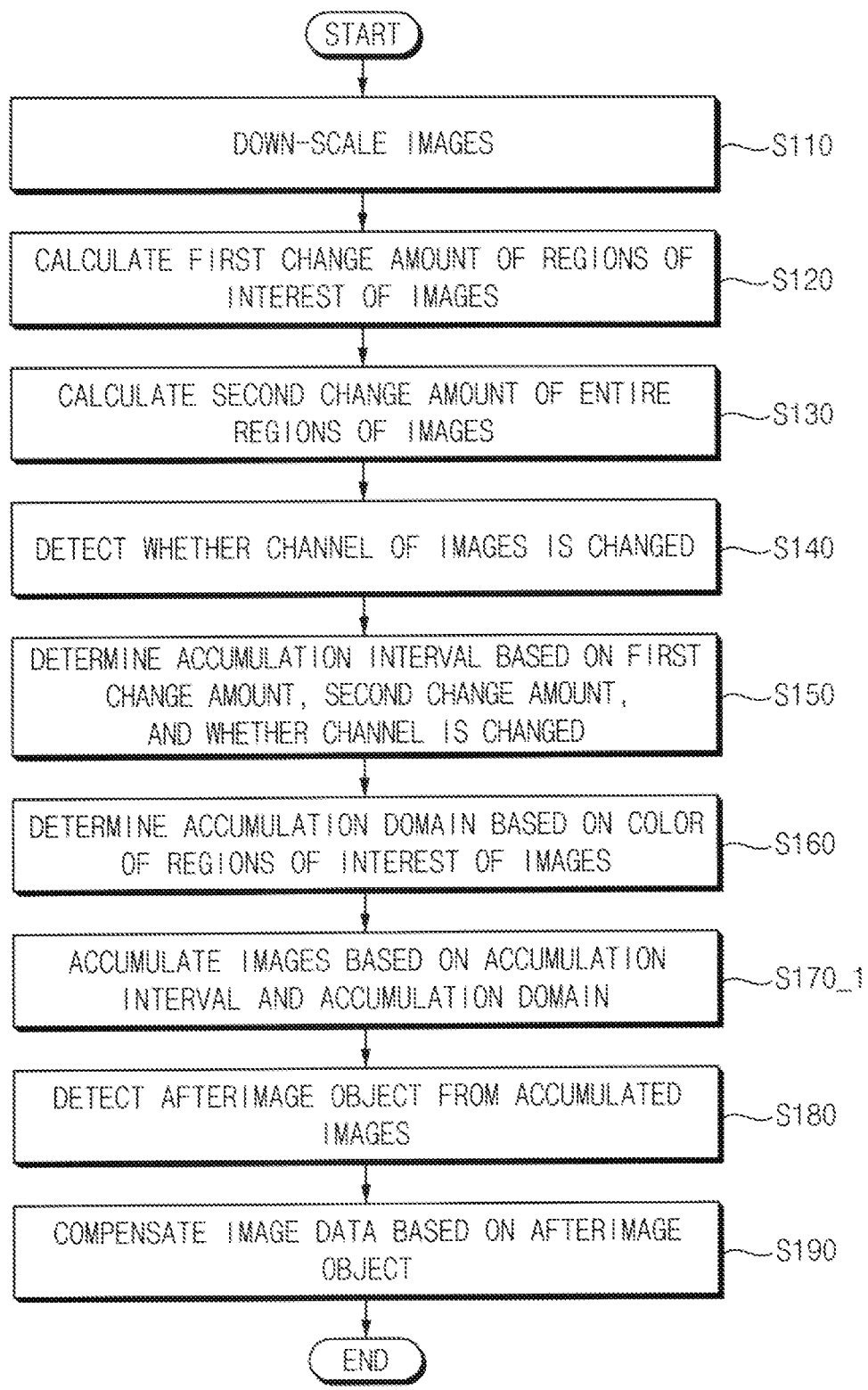
FIG. 10 is a flowchart illustrating a method of compensating afterimage of a display device according to an embodiment.

FIG. 10 is a flowchart illustrating a method of compensating afterimage of a display device 10 according to an embodiment.

Descriptions of components of the method of compensating the afterimage of the display device 10 described with reference to FIG. 10, which are substantially the same as or similar to the method of compensating the afterimage of the display device 10 described with reference to FIG. 7, will be omitted.

Referring to FIG. 10, the accumulation domain determiner 525 may determine the accumulation domain AD based on the colors of the regions of interest ROI of the images IMG (S160). The accumulation domain determiner 525 may determine the RGB domain as the accumulation domain AD when the colors of the regions of interest ROI are chromatic colors, and may determine the YCbCr domain as the accumulation domain AD when the colors of the regions of interest ROI are achromatic colors.

The image accumulator 530_1 may accumulate the down-scaled images IMG based on the accumulation interval AI and the accumulation domain AD (S170_1). The images IMG may be accumulated at regular frame intervals based on the accumulation interval AI determined by the accumulation determiner 520_1 and the format of data stored in the memory may be determined based on the accumulation domain AD determined by the accumulation determiner 520_1. The image accumulator 530_1 may generate the accumulated images AMG based on the down-scaled images IMG, the accumulation interval AI, and the accumulation domain AD.

Figure 11:
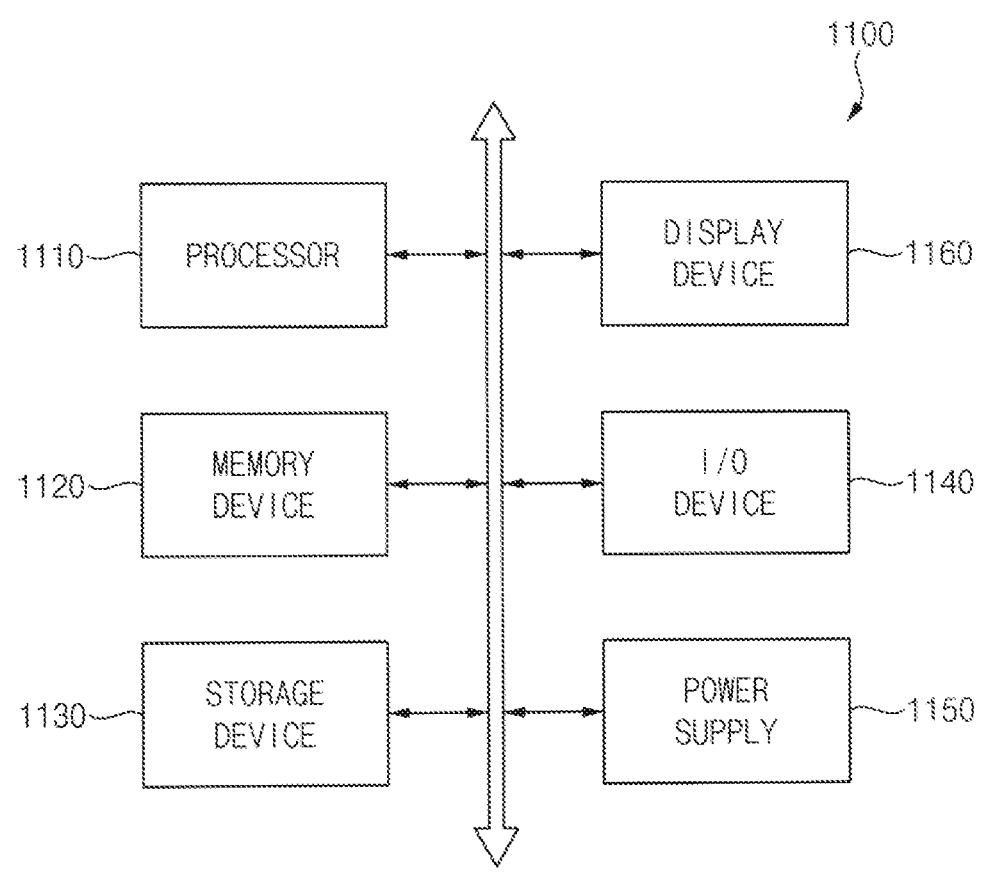
FIG. 11 is a block diagram illustrating an electronic apparatus including a display device according to an embodiment.

FIG. 11 is a block diagram illustrating an electronic apparatus 1100 including a display device 1160 according to an embodiment.

Referring to FIG. 11, the electronic apparatus 110) may include a processor 1110, a memory device 1120, a storage device 1130, an input/output ("I/O") device 1140, a power supply 1150, and a display device 1160. The electronic apparatus 1100 may further include a plurality of ports for communicating with a video card, a sound card, a memory card, a universal serial bus ("USB") device, etc.

The processor 1110 may perform particular calculations or tasks. In an embodiment, the processor 1110 may be a microprocessor, a central processing unit ("CPU"), or the like. The processor 1110 may be coupled to other components via an address bus, a control bus, a data bus, or the like.

In an embodiment, the processor 1110 may be coupled to an extended bus such as a peripheral component interconnection ("PCI") bus.

The memory device 1120 may store data for operations of the electronic apparatus 1100. In an embodiment, the memory device 1120 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1130 may include a solid state drive ("SSD") device, a hard disk drive ("HDD") device, a CD-ROM device, or the like. The I/O device 1140 may include an input device such as a keyboard, a keypad, a touchpad, a touch-screen, a mouse device, etc., and an output device such as a speaker, a printer, etc. The power supply 1150 may provide power for operations of the electronic apparatus 1100. The display device 1160 may be coupled to other components via the buses or other communication links.

The afterimage analyzer included in the display device 1160 may determine the accumulation interval of the images by calculating the change amount of the regions of interest of the images and the change amount of the entire regions of images, so that the afterimage object may be accurately detected even with a low-capacity memory. Further, the display device may compensate the image data based on the detected afterimage object, so that the degradation of the pixels may be prevented.

The display device according to the embodiments may be applied to a display device included in a computer, a notebook, a mobile phone, a smart phone, a smart pad, a PMP, a PDA, an MP3 player, or the like.

Although the display devices, the afterimage analyzers, and the methods of compensating afterimage of the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. An afterimage analyzer comprising:
    an accumulation determiner which determines an accumulation interval of images based on a first change amount of images in regions of interest in which an afterimage object is disposed and a second change amount of images in entire regions;
    an image accumulator which accumulates the images during the accumulation interval to generate accumulated images;
    an afterimage object detector which detects the afterimage object from the accumulated images; and
    a down-scaler which downscales the images and providing the down-scaled images to the accumulation determiner,
    wherein the accumulation determiner includes:
    a region of interest calculator which calculates the first change amount by comparing images in the regions of interest;
    an entire region calculator which calculates the second change amount by comparing images in the entire regions; and
    an accumulation interval determiner which changes the accumulation interval based on the first change amount and the second change amount.

2. The afterimage analyzer of claim 1, wherein the accumulation interval determiner increases the accumulation interval when the first change amount is less than a first reference value.

3. The afterimage analyzer of claim 1, wherein the accumulation interval determiner decreases the accumulation interval when the second change amount is greater than a second reference value.

4. The afterimage analyzer of claim 1, wherein the accumulation determiner further includes a channel change detector which detects whether a channel of the images is changed by comparing the images in the regions of interest, and
    wherein the accumulation interval determiner minimizes the accumulation interval when the channel of the images is changed.

5. The afterimage analyzer of claim 1, wherein the accumulation determiner further includes an accumulation domain determiner which determines an accumulation domain based on colors of the regions of interest, and
    wherein the image accumulator accumulates the images during the accumulation interval and based on the accumulation domain.

6. The afterimage analyzer of claim 5, wherein the accumulation domain determiner determines an RGB domain as the accumulation domain when the colors of the regions of interest are chromatic colors and determines an YCbCr domain as the accumulation domain when the colors of the regions of interest are achromatic colors.

7. The afterimage analyzer of claim 1, wherein the region of interest calculator extracts a motion vector in the regions of interest by comparing the regions of interest of the images and calculates the first change amount based on the motion vector.

8. The afterimage analyzer of claim 1, wherein the region of interest calculator calculates the first change amount based on a ratio of changed pixels to the random pixels which are randomly selected from all pixels disposed in the regions of interest by comparing the images in the regions of interest.

9. The afterimage analyzer of claim 1, wherein the image accumulator accumulates the images after compressing data for the images with a bit truncation.

10. The afterimage analyzer of claim 1, wherein the afterimage object detector includes an artificial intelligence program which performs a machine learning for detecting the afterimage object.

11. A method of compensating an afterimage of a display device, the method comprising:
    determining an accumulation interval of images based on a first change amount of the images in regions of interest in which an afterimage object is disposed and a second change amount of images in entire regions;
    accumulating the images during the accumulation interval to generate accumulated images;
    detecting the afterimage object from the accumulated images;
    compensating image data based on the afterimage object; and
    down-scaling the images before the determining the accumulation interval, wherein the determining the accumulation interval includes:
calculating the first change amount by comparing images in the regions of interest;
calculating the second change amount by comparing images in the entire regions; and
changing the accumulation interval based on the first change amount and the second change amount.

12. The method of claim 11, wherein the changing the accumulation interval includes increasing the accumulation interval when the first change amount is less than a first reference value and decreasing the accumulation interval when the second change amount is greater than a second reference value.

13. The method of claim 11, wherein the determining the accumulation interval further includes detecting whether a channel of the images is changed by comparing the images in the regions of interest and minimizing the accumulation interval when the channel of the images is changed.

14. The method of claim 11, further comprising determining an accumulation domain based on colors of the regions of interest, and
wherein accumulating the images includes accumulating the images during the accumulation interval and based on the accumulation domain.

15. The method of claim 14, wherein the determining the accumulation domain includes determining an RGB domain as the accumulation domain when the colors of the regions of interest are chromatic colors and determining an YCbCr domain as the accumulation domain when the colors of the regions of interest are achromatic colors.

16. A display device comprising:
a display panel including a plurality of pixels;
an afterimage analyzer which detects information of an afterimage object from images;
an afterimage compensator which compensates image data based on the information of the afterimage object; and
a data driver which provides data signals corresponding to accumulated images to the display panel,
wherein the afterimage analyzer includes:
an accumulation determiner which determines an accumulation interval of the images based on a first change amount of the images in regions of interest in which the afterimage object is disposed and a second change amount of images in entire regions;
an image accumulator which accumulates the images during the accumulation interval and generate the accumulated images;
an afterimage object detector which detects the afterimage object from the accumulated images; and
a down-scaler which downscales the images and providing the down-scaled images to the accumulation determiner, and
wherein the accumulation determiner includes:
a region of interest calculator which calculates the first change amount by comparing images in the regions of interest;
an entire region calculator which calculates the second change amount by comparing images in the entire regions; and
an accumulation interval determiner which changes the accumulation interval based on the first change amount and the second change amount.

* * * * *